Figure 1:
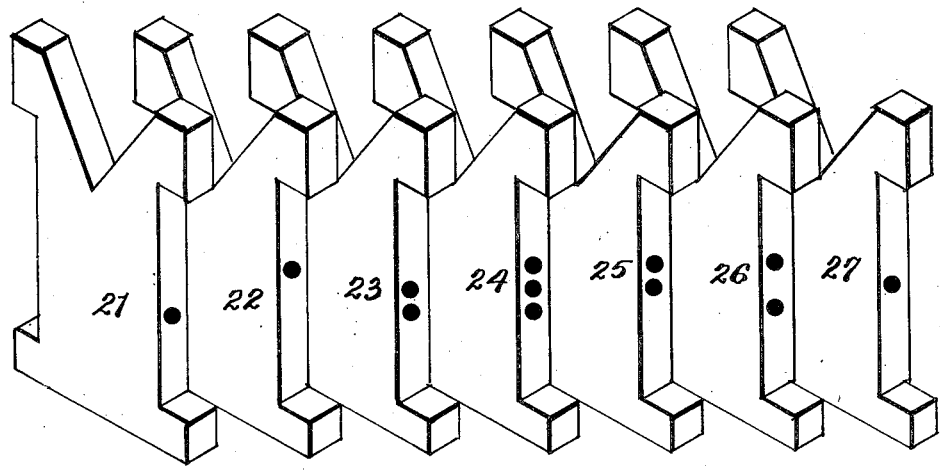

April 21, 1936. SAMU-EL ISH-SHALOM ET AL 2,038,243
MEANS FOR PRODUCING RAISED PRINTING FOR THE BLIND
Filed Nov. 2, 1935 4 Sheets-Sheet 1

INVENTORS
Samu-el Ish-Shalom and
Otto T. Bloom
BY
Harry Radzinsky
ATTORNEY.

April 21, 1936. SAMU-EL ISH-SHALOM ET AL 2,038,243
MEANS FOR PRODUCING RAISED PRINTING FOR THE BLIND
Filed Nov. 2, 1935 4 Sheets-Sheet 2
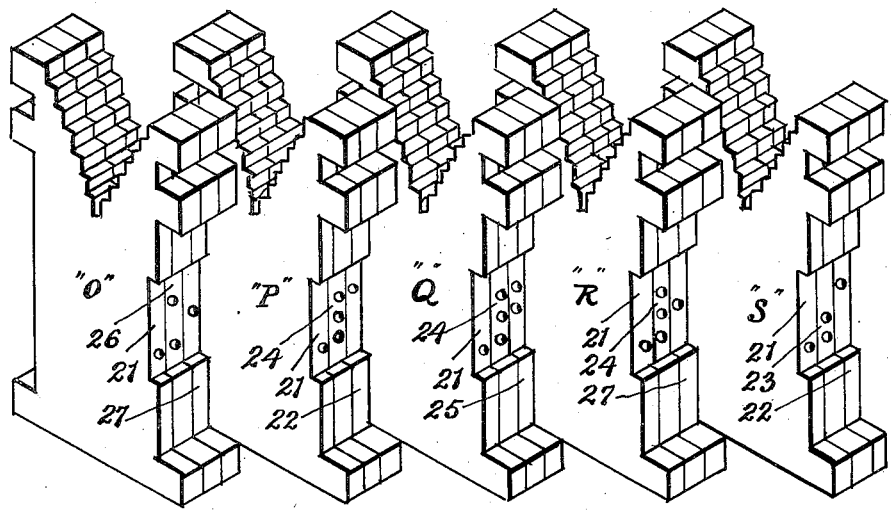
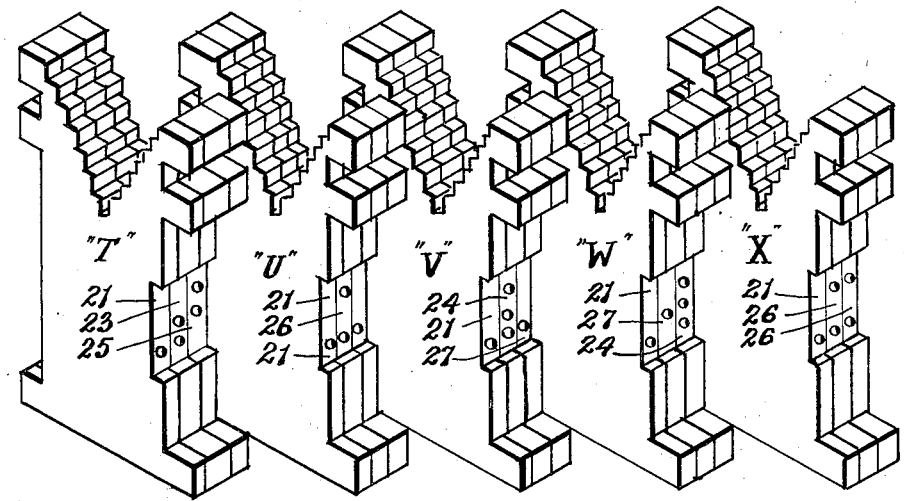
INVENTORS
Samu-el Ish-Shalom &
Otto I. Bloom
BY
Harry Rudzinsky
ATTORNEY.

April 21, 1936. SAMU-EL ISH-SHALOM ET AL  2,038,243
MEANS FOR PRODUCING RAISED PRINTING FOR THE BLIND
Filed Nov. 2, 1935  4 Sheets-Sheet 3

INVENTOR.S
Samu-el Ish-Shalom and
BY Otto I. Bloom
Harry Radzinsky
ATTORNEY.

April 21, 1936. SAMU-EL ISH-SHALOM ET AL 2,038,243
MEANS FOR PRODUCING RAISED PRINTING FOR THE BLIND
Filed Nov. 2, 1935 4 Sheets-Sheet 4
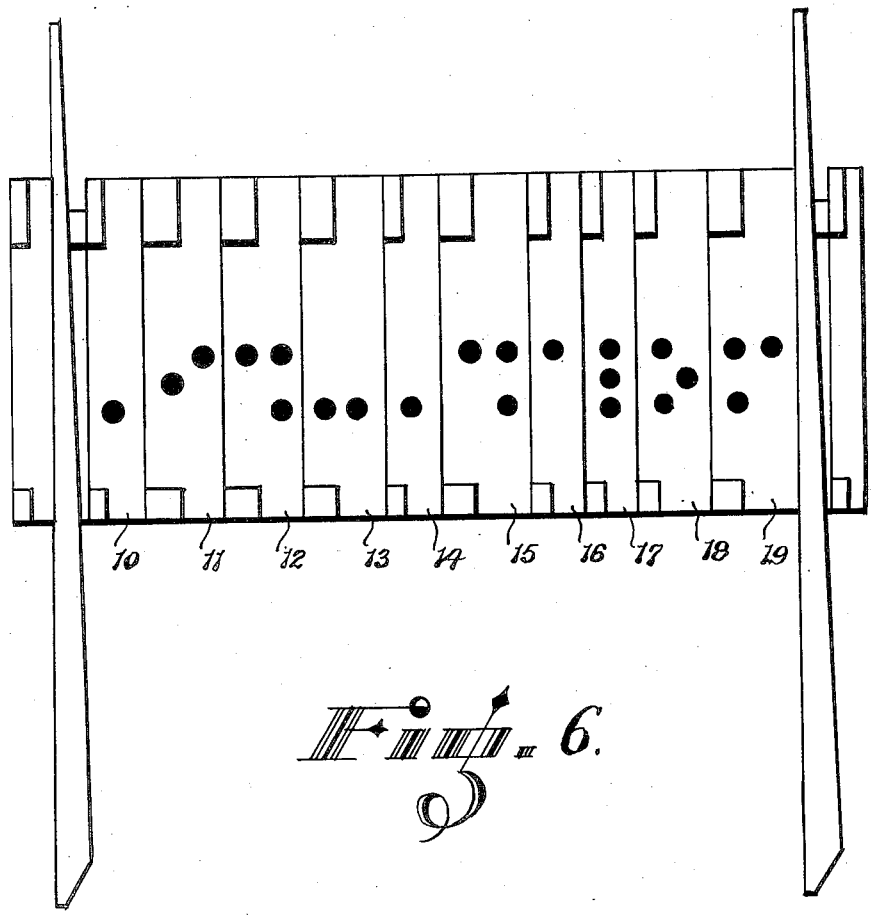
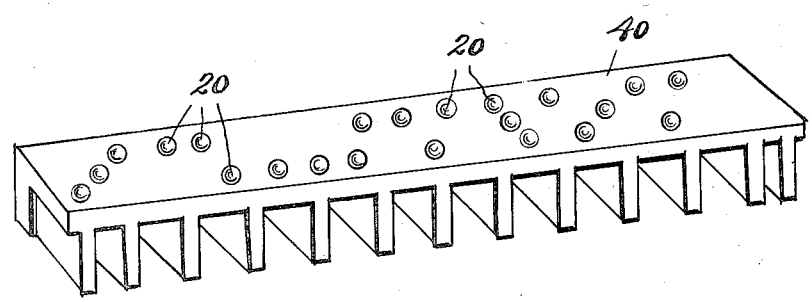
INVENTORS
Samu-el Ish-Shalom and
BY Otto I. Bloom
ATTORNEY.

Patented Apr. 21, 1936

2,038,243

UNITED STATES PATENT OFFICE 2,038,243

MEANS FOR PRODUCING RAISED PRINTING FOR THE BLIND

Samu-el Ish-Shalom and Otto I. Bloom, New York, N. Y.

Application November 2, 1935, Serial No. 47,921

2 Claims. (Cl. 199—66)

This invention relates to a means for the production of raised characters formed of points or other symbols which, through the sense of touch will convey to the individual and particularly to the blind, tactile representations of the visual images or letters used in writing. The raised points are arranged so as to represent letters, punctuations, accents in many languages and also musical signs and mathematical symbols. Such a form of printing or embossing is used exclusively to allow the blind to apprehend printed language, music, etc. by the sense of touch in the same way as the normal individual apprehends them through the visual sense. The usual graphic character intended for the seeing individual representing letters built up into words, symbols, etc., finds its equivalent, when used for the blind, in another character which instead of being represented on the plane surface on the paper is represented by a raised dot or symbol which the blind individual identifies by the sense of touch. By variations in number and/or position of a specific number of dots or symbols various alphabetical letters or combinations of letters are produced.

The present method for the production of these letters or symbols are metal plates embossed, first on one side and then on the other, so that a sheet of paper placed between them will receive an impression on both sides. The compression of paper in this manner between raised projecting metal parts and an opposing sheet or blanket of rubber has hitherto been the only dependable method of producing embossed printing for the blind. With that method the plates can be used only once, errors once made are difficult to correct, and also the paper must be lifted off the plates rather than be removed smoothly. Such a method also requires a special machine known as a "stereotyper" for the punching of the plates and only especially skilled operators who are acquainted with this embossing system can operate the machines or make the plates. These factors cause the system to be expensive, laborious, slow and subject to errors.

In general, the main object of this invention is to produce embossed typographical characters in a manner at once economical, speedy and applicable. These characters may be the symbols used by the blind for reading in such systems as English or American Braille or New York Point or the Morse Code, or any other system requiring raised points or points and dashes for reading by touch.

Figure 2:
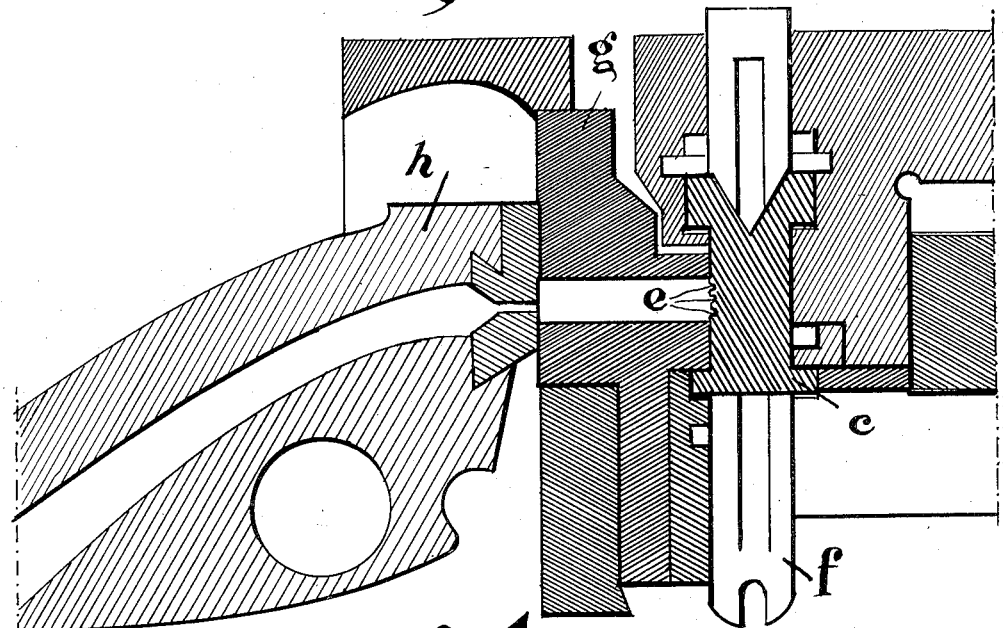
Figure 5:
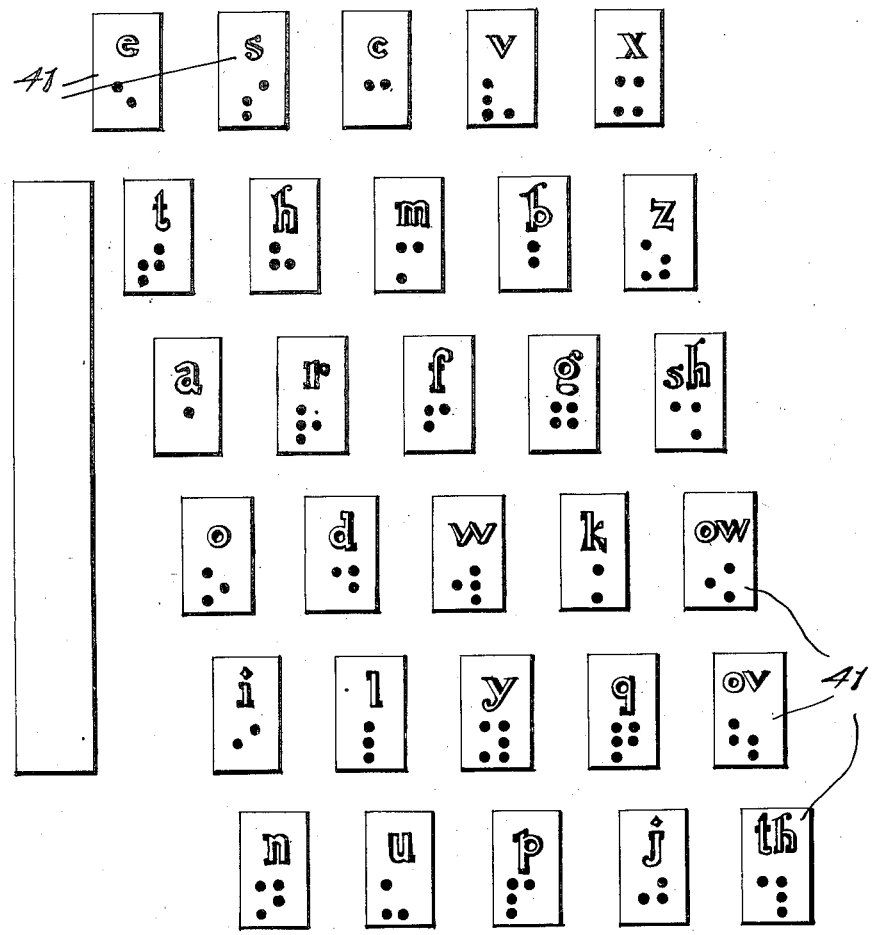

In the accompanying drawings, Fig. 1 is a perspective view showing seven matrices bearing dot characters, these matrices being used both singly and in various combinations to form the dot arrangements used to represent letters of the alphabet; Fig. 2 is a sectional view through portions of a line-casting machine, showing the manner in which the slugs are formed from which the embossing is produced; Figs. 3 and 4 show the matrices of Fig. 1 placed together to form various combinations; Fig. 5 shows a keyboard layout for a composing machine of standard construction, the keys thereof bearing English alphabetical letters and the corresponding symbols employed for embossing the raised symbols used for reading by the blind; Fig. 6 shows a line of matrices assembled and ready for presentation before the mold, each matrix bearing on its casting surface a complete character or letter of the kind used in reading by the blind; and Fig. 7 shows a slug bearing a line of characters for use in producing embossed reading matter for the blind.

Essentially, our invention contemplates the use of two different systems by which embossed printed matter of the character herein described may be produced. The first or single matrix method is shown in Fig. 7. There are shown a number of matrices 10 to 19 inclusive, each of which bears a complete character. This example serves to indicate the manner in which matrices may be formed and assembled through the mechanism found in the conventional type of line-composing machine, to produce a cast slug 40 shown for example in Fig. 7, said slug bearing rounded, conical or dome-shaped protuberances 20 arranged to form a line of letter representations. A group of slugs of this kind when assembled are placed in the conventional type of printing press and when used in combination with the soft or rubber base or blanket will emboss a sheet of paper to produce raised impressions of the kind used by the blind for reading by touch. The advantages of composing raised printing in this way will be apparent. The speed by which the type can be composed and cast on a slug is very much greater than if produced by embossing on a sheet of metal, as is done by the present day method of producing embossed printing for the blind. Simple embossed printing of this kind can be produced by every typecasting machine operator so that special operators are not necessary. Lead slugs may be remelted and the metal used again and again, whereas embossed metal plates of the kind conventionally used are seldom, if ever, reused. If errors are made in lead castings, the slug can be melted and reused without waste. Through the use of our invention, it is possible to cut the cost of typographical embossing, or more material can be produced with the same expenditure of money, with less effort, and with greater speed and ease.

The second or multi-matrix method employed by us uses only seven matrices, each of which bears one, two or three dot characters. These matrices 21 to 27 inclusive are shown in Fig. 1 and each of these matrices contains one, two or three dots arranged to indicate a complete or partially complete letter or symbol according to the blind alphabet. Also, these matrices are used in groups of two or three to indicate other letters or symbols.

These matrices 21 to 27 inclusive, are shown in Figs. 3 and 4 grouped together to form various letters of the English Braille alphabet. There the first group of three matrices at the left of Fig. 3 forms the capital letter "O" and is composed of contiguously placed matrices 21, 26 and 27. The next group forms capital letter "P" and is composed of matrices 21, 24 and 22. The next group forms capital letter "Q" and is composed of matrices 21, 24 and 25. The other groups in Figs. 3 and 4 form the letters which have been applied to them and are composed of the matrices there indicated. The matrix 21 appearing as part of the matrix combinations disclosed in Fig. 3, is shown to bear a single dot, a single dot in the Braille alphabet indicating a capital letter. Therefore the matrix 21 is used in the matrix combinations shown, to indicate that each of the Braille letters represented by these combinations is a capital letter.

In order to provide proper embossed or raised printing, the depressions in the matrices, shown at e in Fig. 2, are rounded or dome or cone-shaped, rather than flattened at their inner terminations. This prevents tearing of the paper during the embossing operation.

In actual operation, the casting of the slugs is extremely simple. In the case of matrices which carry the complete letters in embossed type, such as shown in Fig. 6, the Latin or Semitic letter-equivalent of these letters appears as the indicator keys 41 of the keyboard as shown in Fig. 5. The compositor adjusts and sets his machine as for ordinary composition since he sets from Latin or other alphabet text. As he casts each Latin or Semetic letter its embossing-type equivalent on a single matrix is released and goes through the usual line-casting automatic operations and when a line is built up, is cast into a solid slug. This is shown in Fig. 2 where a line of matrices is shown at c, spaced by the space bands f and held before the casting mold g and connected casting box h.

In the multiple matrix method where each matrix carries but a single vertical line of characters as shown in Fig. 1, and where some letters may require to be built up by the use of two or three matrices as shown in Figs. 3 and 4, the operator proceeds exactly as before. The machine however, can be set to release, automatically and in proper sequence, one or two matrices as may be called for by the letter required. The subsequent process of alignment, spacing casting, delivery, etc. is identically the same as in any other line-casting operation.

What we claim is:

1. Matrices or matrix sections for producing slugs for reading by the blind by tactile sense adapted to be used either singly or combined to produce the characters of a font for use in a line-composing machine, comprising a series of different matrices of seven or less matrix sections having circular depressions rounded at the bottom on the longitudinal axis of the face, the arrangement of the depressions on the various sections being different, said sections being used singly or two or more of said sections adapted to be associated set-wise to produce complete characters and to produce a justified slug for embossing for reading by the blind.

2. A matrix for producing slugs for reading by the blind by tactile sense, having circular dot-forming depressions rounded at the bottom on the longitudinal axis of the face, the arrangement of the depressions on the various matrices being different, the depressions on each matrix being centrally located between the longitudinal sides of the matrix to permit any one matrix to be used between two other matrices or else placed on either side of any other matrix and always secure uniform dot spacing relative to the dots on its associated matrix or matrices, any one matrix being capable of single use or in contiguous set-wise association with two or more matrices to produce complete characters and to form a justified slug for embossing for reading by the blind.

SAMU-EL ISH-SHALOM.
OTTO I. BLOOM.